(12) United States Patent
Bacon et al.

(10) Patent No.: US 12,359,603 B2
(45) Date of Patent: Jul. 15, 2025

(54) COMBINED SENSOR ARRANGEMENT

(71) Applicant: Ford Global Technologies, LLC, Dearborn, MI (US)

(72) Inventors: Malcolm Jonathan Bacon, Ongar (GB); Michael Robert Garrard, Chelmsford (GB); Evan Fisher, Detroit, MI (US); Thomas Dressing, Livonia, MI (US); Yang Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 17/956,530

(22) Filed: Sep. 29, 2022

(65) Prior Publication Data

US 2024/0110500 A1 Apr. 4, 2024

(51) Int. Cl.
| | |
|---|---|
| *G01L 19/00* | (2006.01) |
| *F01N 11/00* | (2006.01) |
| *F01N 13/00* | (2010.01) |
| *G01K 1/08* | (2021.01) |
| *G01K 1/14* | (2021.01) |
| *G01K 7/02* | (2021.01) |

(Continued)

(52) U.S. Cl.
CPC .......... *F01N 13/008* (2013.01); *F01N 11/002* (2013.01); *G01K 1/08* (2013.01); *G01K 1/14* (2013.01); *G01K 7/02* (2013.01); *G01K 13/024* (2021.01); *G01L 9/0051* (2013.01); *G01L 19/0092* (2013.01); *G01L 19/14* (2013.01)

(58) Field of Classification Search
CPC ... F01N 13/008; F01N 11/002; G01K 13/024; G01K 1/08; G01K 1/14; G01K 7/02; G01L 9/0051; G01L 19/0092; G01L 19/14

USPC .......................................................... 73/714
See application file for complete search history.

(56) References Cited

U.S. PATENT DOCUMENTS

| | | |
|---|---|---|
| 7,266,440 B2 | 9/2007 | Ikemoto et al. |
| 9,518,354 B2 | 12/2016 | Kulkarni et al. |

(Continued)

FOREIGN PATENT DOCUMENTS

| | | |
|---|---|---|
| CN | 111699305 B | 12/2021 |
| CN | 113982728 A | 1/2022 |

(Continued)

OTHER PUBLICATIONS

Combination Sensor, Especially Pressure And Temperature Sensor, For Use In Motor Sport Or Aerospace Applications Has A Compact Design And Is Easily Mounted (Year: 2002).*

*Primary Examiner* — Peter J Macchiarolo
*Assistant Examiner* — Rodney T Frank
(74) *Attorney, Agent, or Firm* — Haley Guiliano LLP

(57) ABSTRACT

A sensing apparatus includes two or more sensor arrangements, a housing which is configured to house the two or more sensor arrangements, a first sensor arrangement which is configured to sense a first property, a second sensor arrangement which is configured to sense a second property, and an output arrangement which is configured to provide an output signal from the sensing apparatus in dependence upon an output of the first sensor arrangement and an output of the second sensor arrangement, the first property is different from the second property, and the sensing arrangement is configured to provide a combined signal output by way of the output arrangement.

17 Claims, 5 Drawing Sheets

(51) Int. Cl.
*G01K 13/024* (2021.01)
*G01L 9/00* (2006.01)
*G01L 19/14* (2006.01)

(56) References Cited

U.S. PATENT DOCUMENTS

2018/0266885 A1* 9/2018 Kawai .................... G01J 5/048
2021/0087988 A1 3/2021 Wiman et al.

FOREIGN PATENT DOCUMENTS

DE 10109095 A1 * 9/2002 ............. G01D 21/02
FR 2853693 A1 10/2004

* cited by examiner

COMBINED SENSOR ARRANGEMENT

BACKGROUND

The present disclosure relates to the devices and systems for the management of gas or liquid flows. More particularly, but not exclusively, the present disclosure relates to a sensing device, configured to provide an output signal based on an input signal from a particulate filter pressure sensor and exhaust gas temperature sensor.

SUMMARY

Pollutants released by automobiles are heavily controlled and must meet strict emissions standards imposed by world governments. Such pollutants include but are not limited to hydrocarbons, carbon monoxide, nitrous oxides, sulphur oxides, particulate matter such as soot or smoke and other volatile organic compounds; for example, NMOC.

Consequently, vehicle manufacturers and the like often employ the use of exhaust gas after treatment devices such as particulate filters for Diesel (DPF) and gasoline (GPF) to reduce the number of pollutants entering the wider atmosphere.

Soot, a by-product of normal engine operation, builds up in the particulate filter over time and as a result of the combustion process. Soot is a solid and thus may not pass through the walls of the filter and so remains there. The build-up of soot may inhibit the flow of fluid through the filter, and thus may increase the fluid flow pressure before the filter. An excess build-up of soot can affect engine performance. This build-up of soot may be detected by a fluid pressure sensor.

Particulate filters go through a regeneration process which removes this soot, thus increasing the fluid flow through the filter, and therefore lowering the filter pressure drop back to an acceptable level. Regeneration is the process of oxidizing (burning) the accumulated soot from the filter. This can be done either passively from the engine's exhaust heat in normal operation or actively introducing very high heat into the exhaust system. Particulate filter regeneration may generally be controlled by the vehicles Engine Control Unit ('ECU'), and both approaches to filter regeneration require a fluid temperature sensor to manage and monitor this process.

A combination of fluid pressure and temperature sensors is common for an emissions control system. Often, such sensors are formed as separate units, and such sensors are expensive due to the high temperatures of an exhaust and exhaust gases. Each sensor requires a connection to the vehicle's ECU. Moreover, the added requirement of mounting arrangements at lower temperatures and vibration for the electronics and a high temperature and vibration connection to sense the fluids inside the exhaust adds to the cost and complexity.

According to some aspects of the disclosure, systems and devices are provided that include a sensing apparatus which includes two or more sensor arrangements. The sensing apparatus including a housing which is configured to house the two or more sensor arrangements, a first sensor arrangement which is configured to sense a first property, and a second sensor arrangement which is configured to sense a second property where the first property is different from the second property. The sensing apparatus further including an output arrangement which is configured to provide an output signal from the sensing apparatus in dependence upon an output of the first sensor arrangement and an output of the second sensor arrangement, where the sensing arrangement is configured to provide a combined signal output by way of the output arrangement.

In some examples, the second sensor arrangement is located within the structure of the first sensor arrangement.

In some examples the second sensor arrangement is coaxial to the first sensor arrangement.

In some examples one or both sensor arrangements are attachable to the housing.

In some examples one or both sensor arrangements are partially outside of the housing.

In some examples the second sensor arrangement is configured to sense a fluid temperature.

In some examples the first sensor arrangement is configured to sense a fluid pressure.

In some examples the combined signal output from the first and second sensor arrangements pass through a control circuitry.

In some examples the control circuitry comprises an application-specific integrated circuit.

In some examples the application-specific integrated circuit is a signal processing unit.

In some examples the combined signal output is communicated through at least one single edge nibble transmission.

In some examples the single edge nibble transmission is configured to operate at 5 volts.

In some examples the sensing apparatus includes one or more mounting arrangements.

In some examples the sensing apparatus is configured to be attachable to an exhaust system.

In some examples the mounting arrangement is configured to be attachable to a mounting structure.

In some examples the sensor arrangement is configured to allow the first and second sensors to pass through the wall of a structure to which the sensor is attached.

According to one aspect of the present disclosure, an exhaust system for an internal combustion engine in a vehicle is provided. The exhaust system comprises an exhaust gas after treatment device, an exhaust exit pipe, and a sensing apparatus. The sensing apparatus comprising two or more sensor arrangements. The sensing apparatus including a housing which is configured to house the two or more sensor arrangements, a first sensor arrangement which is configured to sense a first property, and a second sensor arrangement which is configured to sense a second property where the first property is different from the second property. The sensing apparatus further including an output arrangement which is configured to provide an output signal from the sensing apparatus in dependence upon an output of the first sensor arrangement and an output of the second sensor arrangement, where the sensing arrangement is configured to provide a combined signal output by way of the output arrangement.

According to an aspect of the present disclosure, an exhaust system for a vehicle is provided. The exhaust system comprises an exhaust pipe which includes a sensor aperture and a sensor mounting point, a sensing apparatus which includes two or more sensor arrangements, a housing configured to house the two or more sensor arrangements, and a mounting arrangement, wherein the mounting arrangement is configured to attach to the sensor mounting point and the two or more sensor arrangements are configured to pass through the sensor aperture in the exhaust pipe, and the first sensor arrangement which is configured to sense a first property and the second sensor arrangement which is configured to sense a second property, the first property being different from the second property, and the sensing apparatus is configured to provide a combined signal output from the first and second sensor arrangements According to one aspect of the present disclosure, a fluid flow management system, e.g., an exhaust system, for a vehicle is provided.

It shall be appreciated that other features, aspects and variations of the present disclosure will be apparent from the disclosure of the drawings and detailed description.

Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which:

FIG. 1 illustrates an exemplary section view of a sensing apparatus, in accordance with some examples of the disclosure.

FIG. 2 further illustrates an exemplary section view of a sensing apparatus, in accordance with some examples of the disclosure.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
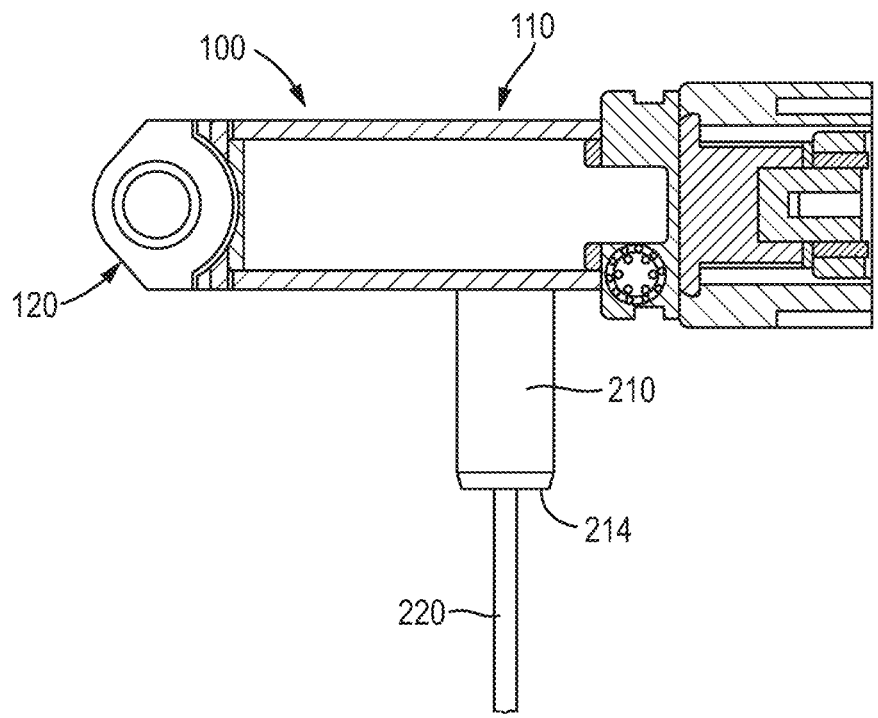

FIG. 1 shows a front view of a sensing apparatus 100, in accordance with some examples of the disclosure. The sensing apparatus 100 comprises a sensor housing 110, a mounting arrangement 120, a first sensor arrangement 210 and a second sensor arrangement 220.

The first sensor arrangement 210 includes a connection arrangement and is configured to sense a first property and the second sensor arrangement 220 also includes a connection arrangement and is configured to sense a second property. In some examples the first sensor arrangement 210 includes a pressure sensor and a connection thereto and the second sensor arrangement 220 includes a temperature sensor and a connection thereto, and the first property is particulate filter pressure ('PFP'), and the second property is exhaust gas temperature ('EGT').

In some examples, the second sensor arrangement 220 is a temperature sensor, and the temperature sensor may take the form of a thermistor or a thermocouple. The operating environment of a typical exhaust is hostile and a typical operating temperature range for a temperature sensor suitable for a vehicle exhaust system is between negative 40 degrees Celsius and 1200 degrees Celsius. In some examples, a typical exhaust gas flow temperature during operation ranges between 300 and 500 degrees Celsius. However, exhaust gas temperatures may vary based upon several factors such as engine load and the location of measurement. In some examples under no load, exhaust gas flow temperatures can range between 200 to 300 degrees Celsius. In other examples at peak loading, exhaust gas flow temperatures can range between 500 to 700 degrees Celsius.

In some examples the pressure sensor may be a micromachined glass diaphragm which includes a circuit. The circuit may be a Wheatstone bridge circuit formed of resistors and attached to or formed as part of the surface of the diaphragm. An analogue amplifier and buffer may be used with the sensor for outputting a signal.

In some examples the sensor housing 110 may be of a shape which most efficiently packages the internal components of the sensing apparatus. In other examples the sensor housing may be of a shape which best accommodates one or more mounting arrangements. In some examples, the first and second sensor arrangements 210 and 220 are configured to be attachable to the sensor housing. When attached, the first and second sensor arrangements may at least partially protrude into the sensor housing 110. In some examples the first and second sensor arrangements 210 and 220 may be substantially housed within the sensor housing 110 such that the sensor arrangements 210 and 220 lie substantially within the sensor housing 110.

The first and second sensor arrangements 210 and 220 may protrude through a common opening in the sensor housing 110. Alternatively, the first and second sensor arrangements 210 and 220 may protrude through separate openings in the sensor housing.

The first sensor arrangement 210, when configured to sense an exhaust pressure, may lie within and protrude out of the sensor housing such that on one end the first sensor arrangement comprises one or more openings through which an atmospheric pressure reading can be obtained by a pressure sensor and on the other end an opening through which fluid communication between an exhaust system fluid and at least one pressure sensor can be facilitated. Both ends of the first sensor arrangement may be configured to be attachable in such a way as to form a seal suitable to enclose a fluid medium and to prevent the loss of any fluid medium through which communication between a pressure sensor and exhaust system fluid may be facilitated. More details regarding the particulate filter pressure sensor are given below when describing FIG. 5.

The second sensor arrangement 220, when configured to sense an exhaust gas temperature, may protrude into the sensor housing such that communication means from the temperature sensor tip, located within the flow of fluid of an exhaust, communicates with control circuitry located within the sensor housing 110.

The second sensor arrangement 220, when located within the flow of fluid of an exhaust, may at least partially protrude into an opening on an exhaust system surface, such that the sensor tip is located within the flow of fluid of an exhaust.

The second sensor arrangement 220 may be installed in an exhaust system in such a way as to form a seal suitable to limit the loss of any fluid flow from an exhaust system.

The mounting arrangement 120 is arranged to allow the sensing apparatus 100 to be attachable to a surface. In some examples the sensing apparatus may accommodate more than one mounting arrangement. The mounting arrangement may accommodate any suitable means by which the sensing apparatus may be attached to a vehicle including both chemical and mechanical means. These means may include but are not limited to, screws, bolts, threaded inserts, rivets, welds, adhesives, clearance fittings, clips, and boss fittings.

Generally, there are two parts to the sensors. A sensing element that responds to the physical parameter being sensed, and the electronics that converts the output into a readable signal. In the case of temperature, the sensing element, thermocouple or temperature dependent resistor, must sit within the medium/exhaust gas. Two high temperature wires connect it to the remotely mounted electronic unit.

Figure 2:
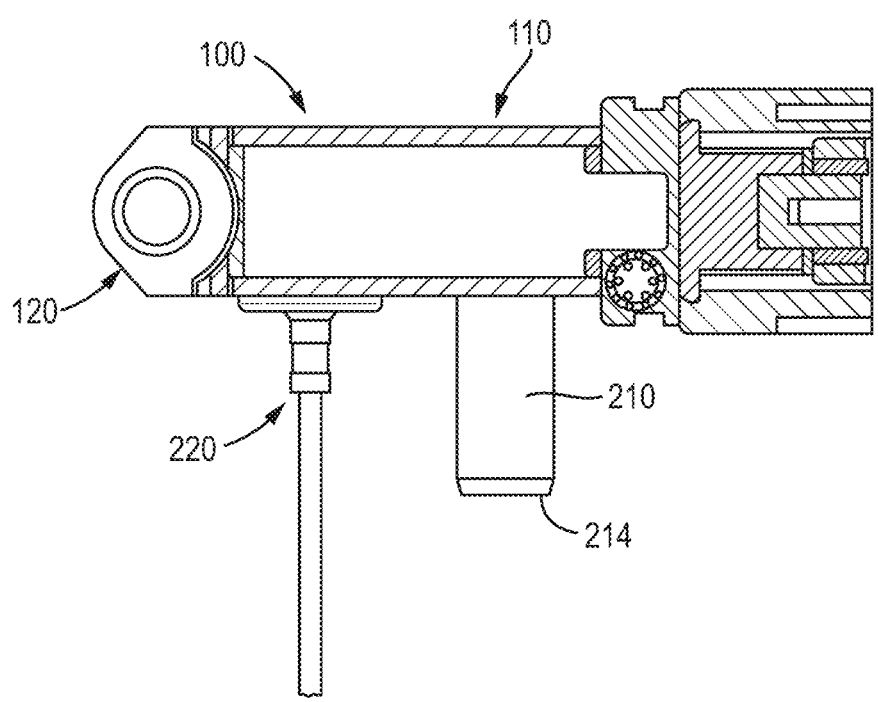

The pressure sensing element, which may be a silicon diaphragm, can sense pressure remotely. Pressure is transmitted to it via a high temperature flexible tube connection. In both cases a boss is required on the exhaust to permit sealed access to the fluid. In the case of FIG. 2, a separate pressure and temperature boss on the exhaust exists. In the case of FIG. 1 a combined single boss is provided.

In some examples the sensing apparatus is attachable to an exhaust system using a boss fitting with the boss fitting being fixed to the exhaust system surface.

Figure 5:
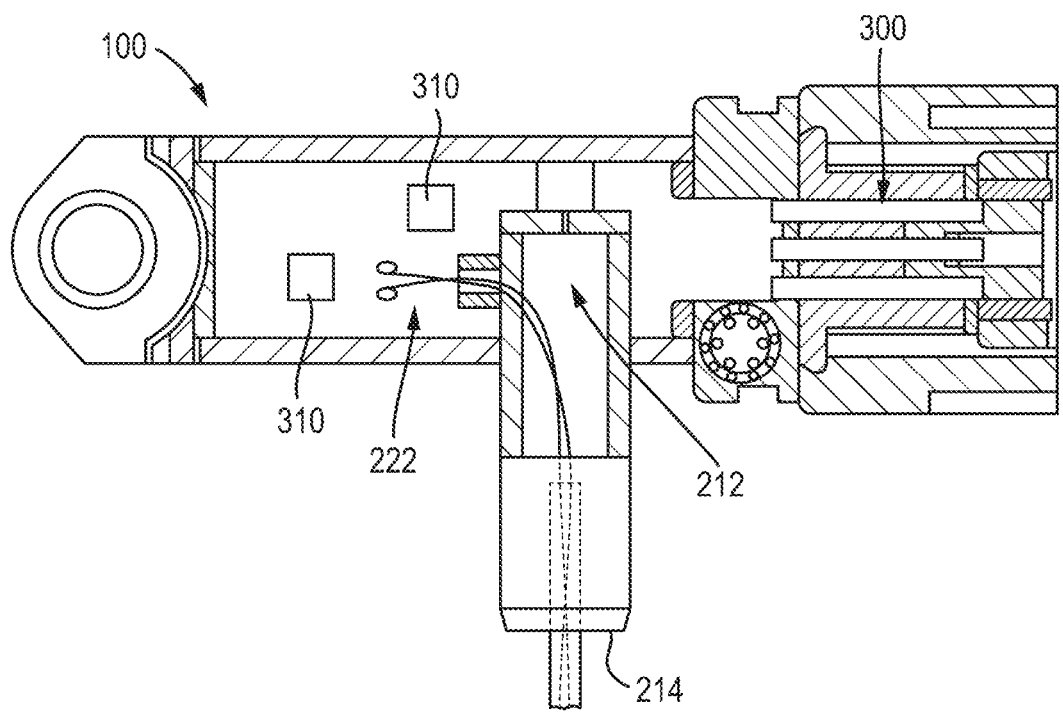
FIG. 5 illustrates an exemplary internal view of the sensing apparatus in accordance with some examples of the disclosure.

In some examples, the first and second sensor arrangements 210 and 220, are arranged to pass through a common opening in the sensor housing. The second sensor arrangement 220, may pass coaxially within the structure of the first sensor arrangement 210 whereby the second sensor arrangement passes through the first sensor arrangement opening 214. In some examples, the second sensor arrangement 220 may pass through the first sensor arrangement opening 214 in such a way that the center of axis of the first sensor arrangement is not in alignment with the center of axis of the second sensor arrangement. In this example the structure of the first sensor arrangement may be configured to act as a protective sleeve for the second sensor arrangement communication wires 222 as seen in FIG. 5. In some examples the protective sleeve may be suitable for high temperature environments.

In an example, the second sensor arrangement 220 passes through an opening formed by the first sensor arrangement 210. This may allow the sensing apparatus to be mounted to the exhaust of a vehicle and to require only one aperture through the exhaust of the vehicle through which the first and second sensors 210 and 220 may enter the exhaust.

In some examples the first sensor arrangement comprises more than one opening through which fluid communication between an exhaust fluid flow may be facilitated or a second sensor arrangement may pass at least partially through. In some examples the first sensor arrangement opening 214 may be approximately tubular or any other shape and is mechanically arranged to provide a fluid flow path to allow exhaust fluid to be in fluid communication with at least one pressure sensor. In this example the second sensor arrangement 220 includes a pair of high temperature wires connecting the thermocouple, inside a glass fiber tube, such that the thermocouple which forms the second sensor arrangement 220 is in the flow of the exhaust fluid so as to measure the temperature thereof.

In this example, the first sensor arrangement opening 214, is configured to allow for fluid communication between an exhaust system fluid and at least one pressure sensor. The second sensor arrangement 220, is configured to allow for communication between an exhaust system fluid and at least one temperature sensor and the second sensor arrangement may be positioned such that when the sensor arrangement is installed in an exhaust system, the second sensor arrangement is positioned within the flow of fluid within the exhaust. In this example the temperature sensor is a thermocouple.

In this example both sensor arrangements are configured to pass at least partially through a common opening of the sensor housing 110. In some examples, such as is shown in FIG. 2, the first and second sensor arrangements 210 and 220, at least partially pass-through separate openings of the sensor housing.

In some examples the first sensor arrangement 210 and second sensor arrangement 220 are either individually or together configured to be at least partially integrated with the sensor housing in such a way that the sensor housing forms part of at least one sensor arrangement. In such examples the first and second sensor arrangements may be configured to be attachable to the sensor housing in such a way as to form a seal suitable to enclose a fluid medium through which the first and second sensor arrangements may be in fluid communication with an exhaust system.

FIG. 2 shows an internal view of a sensing apparatus 100, in accordance with some examples of the disclosure. The sensing apparatus 100 comprises a sensor housing 110, a mounting arrangement 120, a first sensor arrangement 210 and a second sensor arrangement 220. In this example, the first sensor arrangement 210 and second sensor arrangement 220, at least partially pass-through separate openings of the sensor housing.

Figure 9:
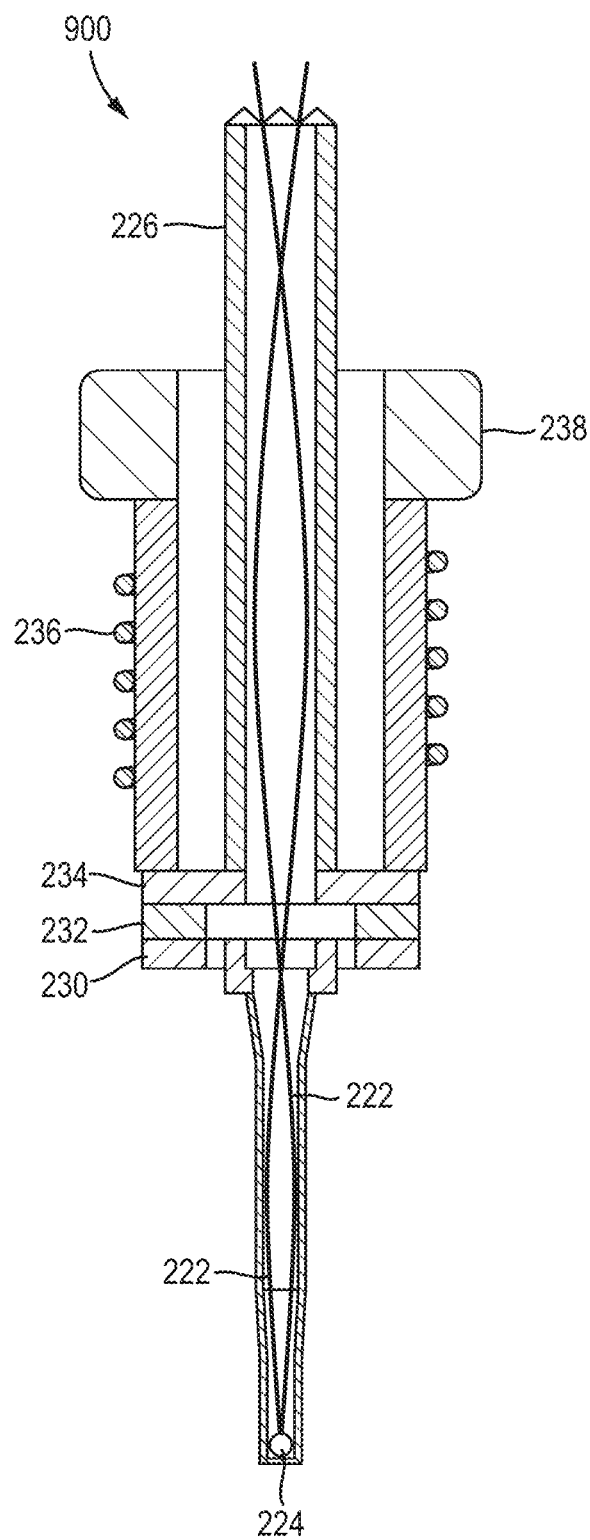
FIG. 9 illustrates an exemplary internal view of part of a sensing apparatus, in accordance with some examples of the disclosure.

In some examples, the second sensor arrangement 220 passes through a separate opening in the sensor housing 110, from the first sensor arrangement 210. In some examples the first and second sensor arrangements 210 and 220, may pass through a single opening in an exhaust by way of a gasket or adapter which is shown in FIG. 9, namely the flanged tube 234. This may allow the sensing apparatus connections to be mounted to the exhaust of a vehicle and to require only one opening through the exhaust of the vehicle through which the first and second sensors 210 and 220 may enter the exhaust, thus, reducing complexity. The sensor arrangement 100 is intended to be mounted to the chassis of a vehicle.

Figure 3:
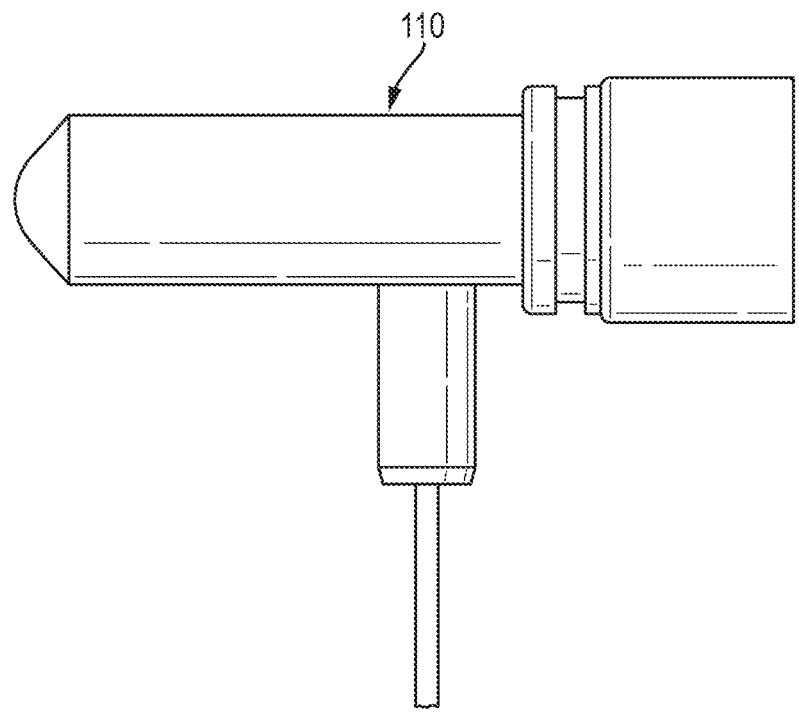
FIG. 3 illustrates an exemplary outline view of the sensor housing, in accordance with some examples of the disclosure.

FIG. 3 shows an outline view of a sensing apparatus 100 comprising a sensor housing 110. The sensor housing comprising an internal cavity suitable for housing the components of the sensing apparatus of FIG. 1. In some examples the sensor housing is configured to accommodate, on one end, at least one mounting arrangement and on the other end, at least one connector. In some examples, the sensor housing may take a form suitable for accommodating more than one mounting arrangement. In some examples the sensor housing may also accommodate at least one sensor arrangement. The sensor housing may be of any shape which most efficiently packages the internal components of the sensing apparatus.

Figure 4:
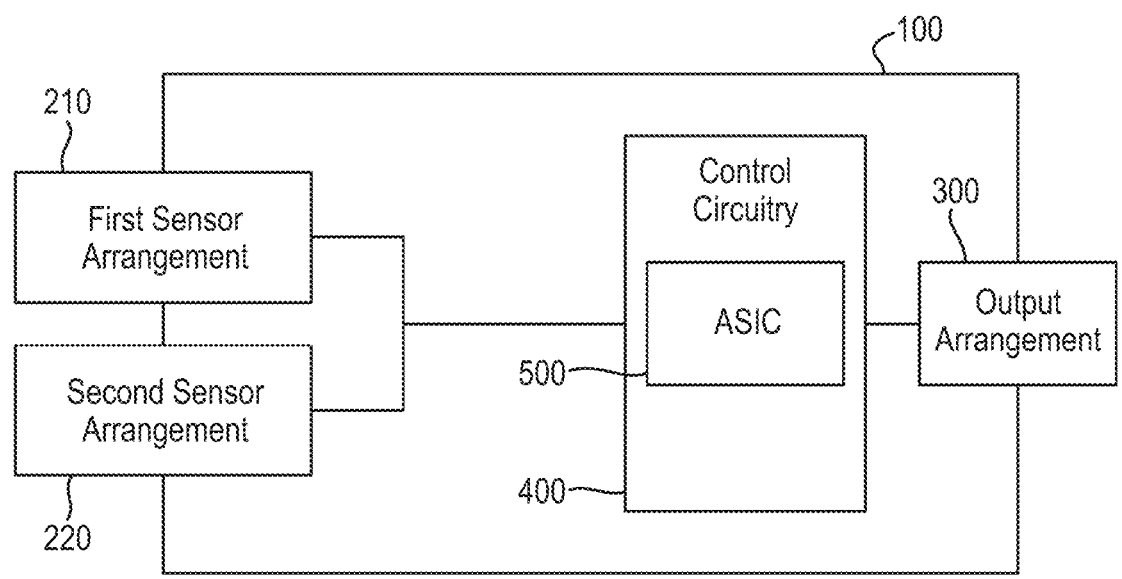
FIG. 4 shows a schematic diagram illustrating the devices and systems for a sensing apparatus, in accordance with some examples of the disclosure.

FIG. 4 shows a schematic of the sensing apparatus 100, of FIG. 1 and FIG. 2. The sensing apparatus comprising a first and second sensor arrangement 210 and 220, a control circuitry 400, and an output arrangement 300.

Figure 8:
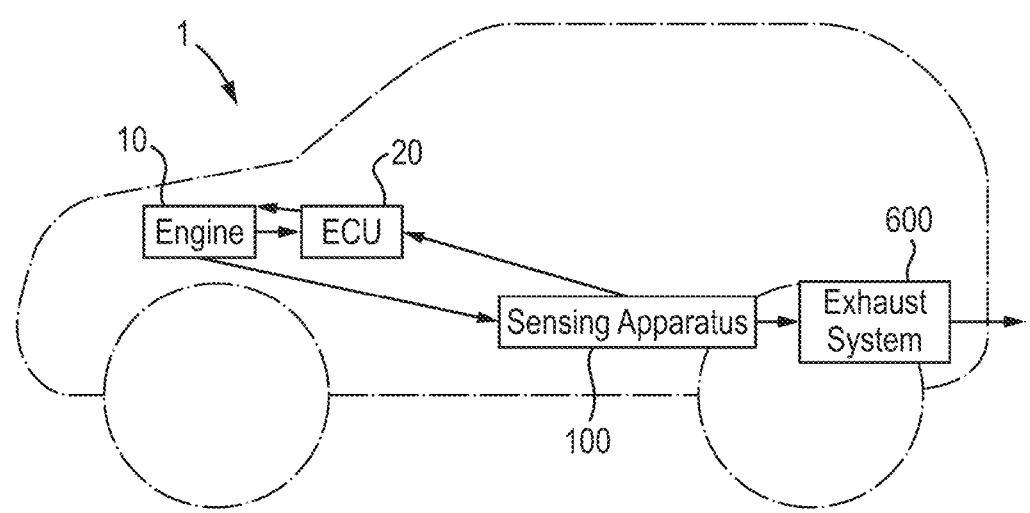
FIG. 8 illustrates an exemplary diagram of a vehicle comprising an engine, ECU, exhaust system and sensing apparatus in accordance with some examples of the disclosure.

In some examples the control circuitry 400, comprises any combination of generic circuit components to accommodate communicating signal values from a sensor to a signal processor. Generic circuit components include but are not limited to central processing units (CPU) that processes data, memory that holds programs and data to be processed, and various input/output devices as peripherals that communicate with the outside world including internal communication connections such as buses. In some examples the control circuitry 400, comprises a field programmable gate array (FPGA) and in other examples an application specific integrated circuit (ASIC) or any other suitable chip configured to process at least one analog signal input to at least one digital signal output. In this example the ASIC 500, is a signal processor, configured to process an analog signal from the first and second sensor arrangements. In some examples, there are more than one signal processors. The output arrangement 300, processes the signal output from the signal processor and is configured to communicate the processed signal to an electrical control unit (ECU) as shown in FIG. 8.

FIG. 5 shows a cutaway of a single-port example as shown in FIG. 1. In some examples the control circuitry comprises at least one sensor interface chip 310, suitable for communicating analog signal values from a sensor to an analog-to-digital signal processor. In some examples a first sensor interface chip (e.g., 310 upper) is configured to communicate an analog signal from a semiconductor pressure sensor and a second sensor interface chip (e.g., 310 left) is configured to communicate an analog signal from an exhaust temperature sensor. In some instances a single interface chip is configured to process signals from both a thermocouple and a semiconductor pressure sensor.

In some examples a pressure sensor is fluidically coupled to the sensor arrangement port 214 (e.g., represented by the white box 212 and small pipe at the inside end of pipe 214). In some examples a gauge pressure sensor is used for 212 and the reference is fluidically coupled to atmospheric pressure. In some examples, the exhaust temperature sensor is connected remotely through wires 222 communicating an analog voltage or current. In some instances a digital representation of the first sensor value is concatenated with a digital representation of the second sensor value and output using a single pin. In other instances an analog representation of the first sensor value an analog representation of the second sensor value are output using individual pins.

Figure 6:
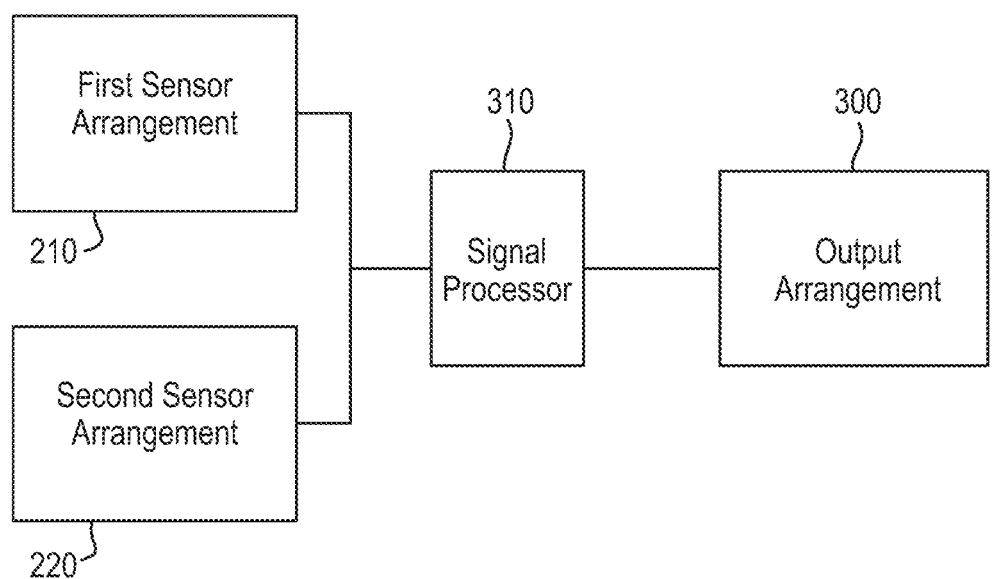
FIG. 6 shows a schematic diagram illustrating a signal flow path from a first and second sensor arrangement through a signal processor and into an output arrangement, in accordance with some examples of the disclosure.

FIG. 6 shows a schematic of a signal path in accordance with some examples of the disclosure. The schematic shows an output arrangement 300, which is configured to provide an output signal from the sensing arrangement in dependence upon an output of the first sensor arrangement 210, and an output of the second sensor arrangement 220. The output of the first and second sensor arrangement passing through a signal processor 310. In some examples the output arrangement may provide an output signal from the sensing apparatus in dependence upon an output from either the first sensor arrangement or the second sensor arrangement or both sensor arrangements. In some examples the output signal is communicated through at least one encoding scheme. In this example the output arrangement is configured to provide a signal output to an ECU as shown in FIG. 8.

In some examples the output signal may be encoded by any suitable analogue-to-digital encoding schemes. Examples of encoding schemes include but are not limited to local interconnect networks (LIN), controller area networks (CAN) and single edge nibble transmissions (SENT). Single Edge Nibble Transmission (SENT) encoding scheme is intended for automotive applications as a simple low-complexity alternative to CAN or LIN. It transmits sensor data from a sensor module to an Engine Control Unit (ECU). A single digital input is all that is required for a SENT sensor as communication is performed through a digital bus and the ECU no longer requires an analogue input with an analogue-to-digital converter. In the example shown in FIG. 6, at least one single edge nibble transmission is used as a simple low-complexity alternative to CAN or LIN. CAN is relatively complex, where LIN is simpler but slower. In some instances the slow channels of SENT are used to communicate additional parameters such as the internal temperature of the control chip, or barometric pressure.

In an example, the outputs of the first sensing arrangement 210 and the second sensing arrangement 220 are connected to the signal processor 310, and the signal processor is configured to output a SENT signal in accordance with established SENT protocols. SENT protocols are known in the art.

Figure 7:
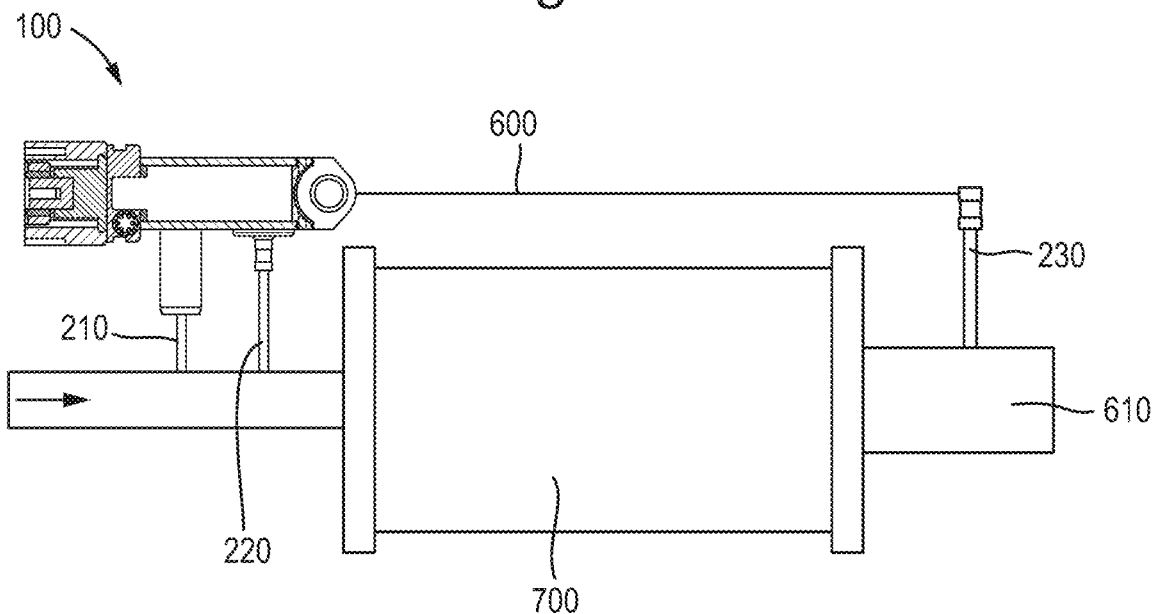
FIG. 7 illustrates an exemplary diagram of an exhaust system in accordance with some examples of the disclosure.

FIG. 7 shows an exhaust system 600, comprising an exhaust gas after treatment device 700, an exhaust exit pipe 610, a sensing apparatus 100, wherein the sensing apparatus is configured to be attachable to the exhaust system in accordance with some examples of the disclosure. The first and second sensors 210 and 220 are shown, along with a third sensor 230 which is the other side of the exhaust gas treatment device. In the present example the exhaust gas treatment device is a gasoline particulate filter (GPF).

In some examples a sensing apparatus is configured to sense a pressure delta across an exhaust gas after treatment device 700. In some examples the pressure delta across an exhaust gas after treatment device requires at least two pressure sensor readings; one entry flow pressure and one exit flow pressure, in examples, in the cases of GPF and EU7/SULEV. In some examples an exhaust system 600 comprises one or more pressure sensors.

In some examples a sensing apparatus is configured to sense a temperature delta across an exhaust gas after treatment device 700. In some examples the temperature delta across an exhaust gas after treatment device requires at least two temperature sensor readings; one entry flow temperature and one exit flow temperature. In some examples an exhaust system 600 comprises one or more temperature sensors.

In the present example the sensing apparatus is configured to sense a PFP and EGT from an exhaust system, positioned at any location along the exhaust system 600. In other examples the sensing apparatus may be configured to be attachable at any point in an exhaust system.

FIG. 8 shows a vehicle 1, in accordance with some examples of the disclosure. The vehicle comprises an engine 10, an engine control unit (ECU) 20, a control circuitry 400, a sensing apparatus 100 and an exhaust system 600. In this example the ECU is configured to receive communication from the sensing apparatus and transmit a control signal to the engine which in turn communicates with an exhaust system. The sensing apparatus 100 is upstream of the exhaust aftertreatment particulate filter.

FIG. 9 shows an example of how both pressure and temperature sensors might be combined for use with a single boss. In FIG. 9, a portion 900 of a sensing apparatus 100, in accordance with some examples of the disclosure is shown. Wires 222 for the thermocouple 224 are protected within the tube 226 that transmits the gas pressure to the remote mounted electronics. The partial sensing apparatus comprising a temperature sensor tip 224, temperature sensor communication wires 222, and a fluid sensor pipe 226. The partial view further comprises a temperature sensor protection tube mounting flange that permits transmission of fluid pressure 230, gas path spacer 232, pressure pipe flange and seal 234, a threaded portion 236 and a free-rotating sensor flange clamp nut 238.

In some examples the temperature sensor tip 224 is located within the flow of fluid of an exhaust. In some examples the temperature sensor tip 224 is in communication with at least one control circuitry located within the sensor housing 110 as shown previously. In some examples the temperature sensor communication wires 222 are located inside the structure of a sensor pipe 226. In some examples the sensor pipe is at least partially made from a temperature resistant material suitable for high temperature environments typical for exhaust flows.

In some examples the sensor pipe 226 is mechanically arranged to provide a fluid flow path to allow exhaust fluid to be in fluid communication with at least one pressure sensor. In some examples the sensing apparatus 100 comprises at least one temperature tube flange 230, and at least one pressure pipe flange and seal 234, suitable to enclose a fluid medium through which the first and second sensor arrangements 210 and 220 may be in fluid communication with an exhaust system, and suitable to eliminate the loss of any fluid flow from an exhaust system. In some examples the sensing pressure pipe flange and seal 234 comprises one or more openings to provide a fluid flow path to allow exhaust fluid to be in fluid communication with at least one pressure sensor.

In some examples the sensing apparatus 100, is configured to be attachable to an exhaust system, in accordance with some examples of the disclosure. In some examples the sensing apparatus is configured to be attachable using a threaded portion 238. In some examples, the sensing apparatus may be attachable to an exhaust system including both chemical and mechanical means. These means may include but are not limited to, screws, bolts, threaded inserts, rivets, welds, adhesives, clearance fittings, clips, and boss fittings. In some examples the mechanical means for attachment may also include a free-rotating clamp nut 238 or any means by which the sensing apparatus is allowed to rotate around a vertical access such that the sensor tip 224 remains at least approximately in the same location within the flow of fluid of an exhaust.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and amendments may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A sensing apparatus including two or more sensor arrangements, the sensing apparatus including: a arrangements; a housing which is configured to house the two or more sensor arrangements; a first sensor arrangement which is configured to sense a fluid pressure using a fluid sensor pipe that transmits the fluid pressure to remote mounted electronics; a second sensor arrangement which is configured to sense a fluid temperature using a temperature sensor tip extending from an end of the fluid sensor pipe, wherein temperature sensor communication wires connecting the temperature sensor tip to the remote mounted electronics are protected within the fluid sensor pipe; wherein the second sensor arrangement is coaxial with the first sensor arrangement; and an output arrangement which is configured to provide an output signal from the sensing apparatus in dependence upon an output of the first sensor arrangement and an output of the second sensor arrangement wherein: the sensing arrangement-apparatus is configured to provide a combined signal output by way of the output arrangement.

2. The sensing apparatus of claim 1, wherein the second sensor arrangement is located within a structure of the first sensor arrangement.

3. The sensing apparatus of claim 1, wherein one or both sensor arrangements are attachable to the housing.

4. The sensing apparatus of claim 1, wherein one or both sensor arrangements are partially outside of the housing.

5. The sensing apparatus of claim 1, wherein the second sensor arrangement is a thermocouple.

6. The sensing apparatus of claim 1, wherein the combined signal output passes through control circuitry.

7. The sensing apparatus of claim 6, wherein the control circuitry comprises an application-specific integrated circuit.

8. The sensing apparatus of claim 7, wherein the application-specific integrated circuit is a signal processing unit.

9. The sensing apparatus of claim 1, wherein the combined signal output is communicated through at least one single edge nibble transmission.

10. The sensing apparatus of claim 9, wherein the at least one single edge nibble transmission is configured to operate at 5 volts.

11. The sensing apparatus of claim 1, wherein the sensing apparatus includes one or more mounting arrangements.

12. The sensing apparatus of claim 11, wherein the one or more mounting arrangements is configured to be attachable to a mounting structure.

13. The sensing apparatus of claim 12, wherein the mounting structure is further configured to be attached to an exhaust system.

14. The sensing apparatus of claim 1, wherein the sensor arrangement is configured to allow the first and second sensors to pass through a wall of a structure to which the sensor is attached.

15. An exhaust system comprising an exhaust gas after treatment device, an exhaust exit pipe, and a sensing apparatus in accordance with claim 1.

16. A vehicle comprising at least one of the sensing arrangements of claim 1.

17. An exhaust system for a vehicle, the exhaust system comprising: an a exhaust pipe which includes a sensor mounting point; a sensing apparatus which includes two or more sensor arrangements, a housing configured to house the two or more sensor arrangements, and a mounting arrangement, wherein the mounting arrangement is configured to attach to the sensor mounting point and the two or more sensor arrangements are configured to pass through the sensor aperture in the exhaust pipe, and wherein: the first sensor arrangement which is configured to sense fluid pressure using a fluid sensor pipe that transmits the fluid pressure to remote mounted electronics and the second sensor arrangement which is configured to sense fluid temperature using a temperature sensor tip extending from an end of the fluid sensor pipe wherein temperature sensor communication wires connecting the temperature sensor tip to the remote mounted electronics are protected within the fluid sensor pipe, wherein the second sensor arrangement is coaxial with the first sensor arrangement, the sensing apparatus is configured to provide a combined signal output from the first and second sensor arrangements.

\* \* \* \* \*